United States Patent
Weldemariam et al.

(10) Patent No.: US 11,301,948 B2
(45) Date of Patent: Apr. 12, 2022

(54) PARKING CONTINUITY WITH UNUSED DURATION BETWEEN AUTOMATED VEHICLES

(71) Applicant: International Business Machines Corporation, Armonk, NY (US)

(72) Inventors: Komminist Weldemariam, Ottawa (CA); Isaac Markus Serfaty, Miami, FL (US); Michael S. Gordon, Yorktown Heights, NY (US); James R. Kozloski, New Fairfield, CT (US); Shikhar Kwatra, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 373 days.

(21) Appl. No.: 16/371,233

(22) Filed: Apr. 1, 2019

(65) Prior Publication Data

US 2020/0311848 A1 Oct. 1, 2020

(51) Int. Cl.
*G06Q 20/40* (2012.01)
*G06Q 50/30* (2012.01)
(Continued)

(52) U.S. Cl.
CPC .............. *G06Q 50/30* (2013.01); *G06N 3/04* (2013.01); *G06N 3/08* (2013.01); *G06Q 20/401* (2013.01); *G06Q 2240/00* (2013.01)

(58) Field of Classification Search
CPC .. G06Q 50/30; G06Q 20/401; G06Q 2240/00; G06N 3/04; G06N 3/08
(Continued)

(56) References Cited

U.S. PATENT DOCUMENTS

| 5,351,187 A | 9/1994 | Hassett |
| 7,893,847 B2 | 2/2011 | Shanbhag et al. |

(Continued)

FOREIGN PATENT DOCUMENTS

| DE | 102015216315 A1 | 3/2017 |
| GB | 2552020 A | 1/2018 |
| KR | 20170039634 A * | 4/2017 |

OTHER PUBLICATIONS

"That Unused Hour on Your Parking Receipt? You Might Think About Selling It," by Matt Flegenheimer, The New York Times, May 30, 2012 (Year: 2012).*

(Continued)

*Primary Examiner* — George Chen
*Assistant Examiner* — Brian Adams Heflin
(74) *Attorney, Agent, or Firm* — Scully, Scott, Murphy & Presser, P.C.; Shimon Benjamin

(57) ABSTRACT

An artificial neural network trained to predict the availability of an unused duration of a parking space based on input features is executed. Input features may include at least a contextual situation associated with the second entity, a behavior factor associated with a first entity that has been using the parking space, geographical location and time, events occurring within a threshold distance from the parking space. The artificial neural network may be further trained to output a transfer affinity based on the predicted availability of an unused duration, the contextual situation associated with the second entity and the behavior factor associated with the first entity. Based at least on the transfer affinity, the second entity can be selected. The unused duration can be transferred to the second entity from the first entity. The transferring can also include storing a payment and associated computation as a blockchain node in a blockchain.

17 Claims, 5 Drawing Sheets

(51) Int. Cl.
*G06N 3/04* (2006.01)
*G06N 3/08* (2006.01)

(58) Field of Classification Search
USPC .......................................................... 705/13
See application file for complete search history.

(56) References Cited

U.S. PATENT DOCUMENTS

| | | | |
|---|---|---|---|
| 8,063,797 B1 | 11/2011 | Sonnabend et al. | |
| 2003/0011494 A1 | 1/2003 | Reider et al. | |
| 2004/0068433 A1 | 4/2004 | Chatterjee et al. | |
| 2009/0183966 A1 | 7/2009 | King et al. | |
| 2010/0039292 A1 | 2/2010 | Scherl et al. | |
| 2010/0283633 A1 | 11/2010 | Becker et al. | |
| 2012/0188101 A1 | 7/2012 | Ganot | |
| 2014/0180774 A1* | 6/2014 | Rangarajan | G06Q 30/0284 705/13 |
| 2015/0279213 A1* | 10/2015 | Balter | G01C 21/36 705/13 |
| 2016/0189435 A1* | 6/2016 | Beaurepaire | G06Q 30/0208 705/13 |
| 2017/0200320 A1 | 7/2017 | Tomer | |
| 2018/0095474 A1* | 4/2018 | Batu | G01S 19/48 |
| 2018/0121833 A1* | 5/2018 | Friedman | G06Q 10/0631 |
| 2018/0376305 A1* | 12/2018 | Ramalho de Oliveira | G08G 1/096775 |
| 2019/0236953 A1* | 8/2019 | Peters | G08G 1/144 |
| 2020/0074862 A1* | 3/2020 | Johnston | G06N 20/20 |
| 2020/0086853 A1* | 3/2020 | Kumar | G05D 1/0088 |
| 2020/0193824 A1* | 6/2020 | Lee | G08G 1/143 |
| 2020/0213329 A1* | 7/2020 | Simons | H04L 9/3226 |
| 2021/0110446 A1* | 4/2021 | Khoo | G06Q 10/1093 |

OTHER PUBLICATIONS

"Vai.ai lets self-driving cars bid for parking spots," by Josh Constine, May 14, 2017 (Year: 2017).*
Angellist, "Smarking", https://angel.co/smarking, Accessed on Mar. 28, 2019, 10 pages.
Angellist, "ParqEx", https://angel.co/parqex, Accessed on Mar. 28, 2019, 15 pages.
Constine, J., "Val.ai lets self-driving cards bid for parking spots", TechCrunch, 2017, https://techcrunch.com/2017/05/14/self-parking-vehicle/, Accessed on Mar. 28, 2019, 15 pages.
Parqex, "Find or list a parking spot", https://www.parqex.com/, Accessed on Mar. 28, 2019, 8 pages.

* cited by examiner

PARKING CONTINUITY WITH UNUSED DURATION BETWEEN AUTOMATED VEHICLES

BACKGROUND

The present application relates generally to computer-implemented apparatus and method, which can facilitate transferring of unused parking space durations between vehicles, for example, self-driving automated vehicles.

Increased presence of automated self-driven vehicles on the road also implies increased need to allow those vehicles to be able to find and park themselves in appropriate parking spots in an efficient manner. Generally, it is common to pay for parking at a pay station in a parking lot. For example, one may enter a parking space number and pay for that space for a number of hours (or for another unit of time). In many instances, vehicles pay for more parking time duration than actually used, for example, so that the possibility of underestimating time and therefore a penalty or fine, which may result, can be avoided. A vehicle that leaves a parking spot before the full parking duration is reached leaves behind an unused parking duration.

BRIEF SUMMARY

A system and method to facilitate transferring of unused parking duration between vehicles is disclosed. A method in one aspect may include predicting availability of an unused duration of a parking space for a second entity. Predicting may include executing a computer-implemented, artificial neural network trained to predict the availability of an unused duration of a parking space based on input features. Input features, in one aspect, may include at least a contextual situation associated with the second entity, a behavior factor associated with a first entity that has been using the parking space, geographical location and time, events occurring within a threshold distance from the parking space. The artificial neural network may be further trained to output a transfer affinity based on the predicted availability of an unused duration, the contextual situation associated with the second entity and the behavior factor associated with the first entity. The method may further include, based at least on the transfer affinity, selecting the second entity. The method may also include transferring the unused duration to the second entity from the first entity. The transferring may further include storing a payment and associated computation as a blockchain node in a blockchain.

A system in one aspect may include at least one hardware processor, a memory device coupled with the at least one hardware processor and a communication interface coupled to the at least one hardware processor. A hardware processor may be operable to predict availability of an unused duration of a parking space for a second entity. Predicting the availability may include executing a computer-implemented, artificial neural network trained to predict the availability of an unused duration of a parking space based on input features, which may include at least a contextual situation associated with the second entity, a behavior factor associated with a first entity that has been using the parking space, geographical location and time, events occurring within a threshold distance from the parking space. The artificial neural network may be further trained to output a transfer affinity based on the predicted availability of an unused duration, the contextual situation associated with the second entity and the behavior factor associated with the first entity. Based at least on the transfer affinity, a hardware processor may be operable to select the second entity. A hardware processor may transfer the unused duration to the second entity from the first entity. A hardware processor may also store a payment and associated computation as a blockchain node in a blockchain.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
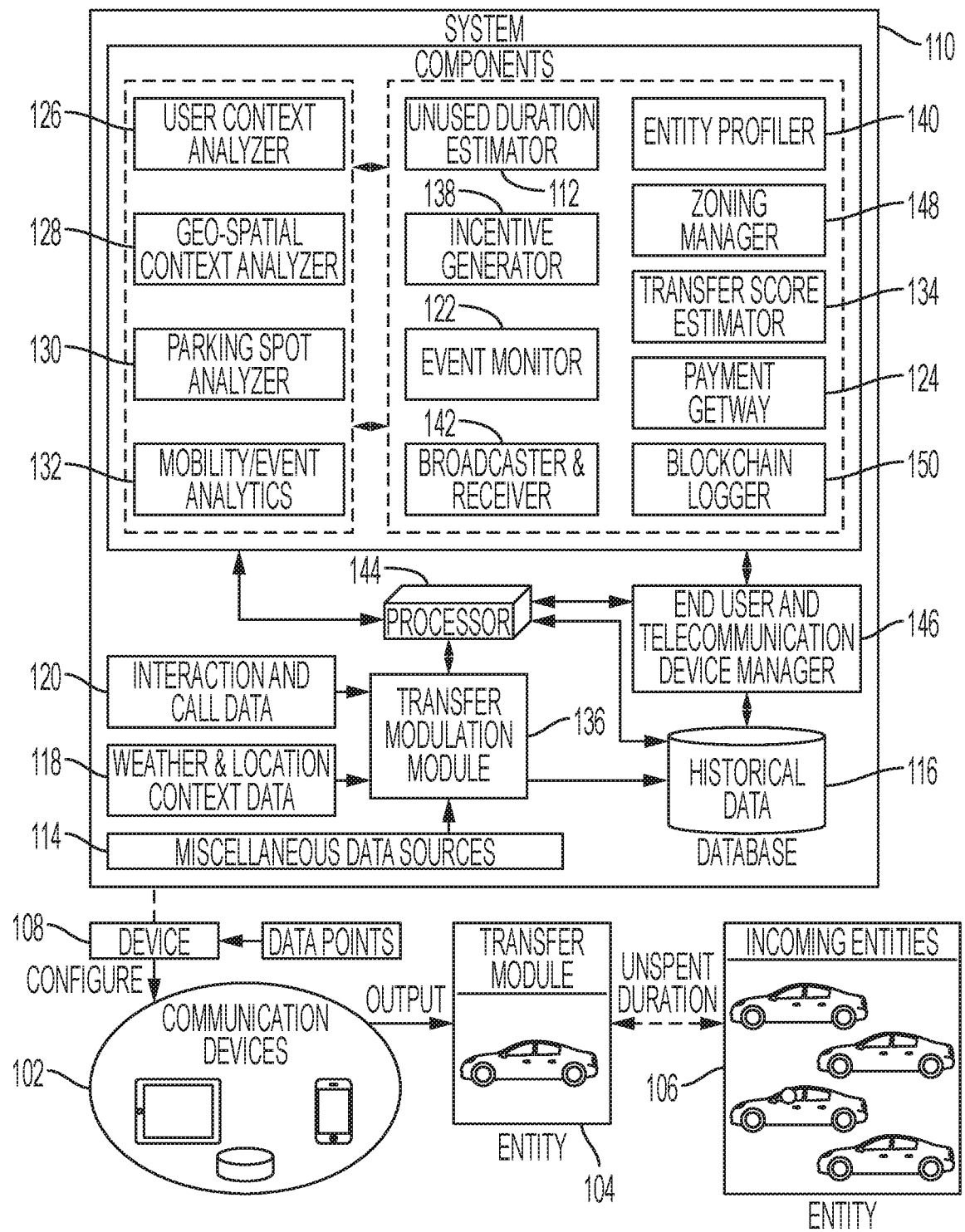
FIG. 1 shows a computing system facilitating parking continuity according to an embodiment.

A method, system and techniques may be provided to facilitate transferring of unused parking spot duration from a primary entity (e.g., a manual or automatic self-driven vehicle (SDV)) to a secondary entity (e.g., a manual or automatic self-driven vehicle) based on contextual analysis. In one aspect, a method may include predicting and broadcasting availability of an unused duration of a parking spot for one or more incoming secondary entities at a parking lot, analyzing transfer decision factors (e.g., temporal context and cognitive state of each secondary entity, geo-spatial context) for the unused duration and possibly for associated parking spot, computing a transfer request score for each incoming secondary entity based on analysis of transferring factors and analysis of the primary entity context, and transferring the unused parking duration for a selected secondary entity based on the transfer request score. A method is disclosed which facilitate vehicle or automobile parking and parking continuity in different aspects, and which may facilitate incentives (e.g., a payment, rating, token, fueling) between the primary and secondary entities may be also provided.

In one aspect, a methodology of the present disclosure may improve crowd source-based coordination of usage-driven and context-based parking lot service, and in particular to techniques for predicting availability of an unused duration of a parking spot and making available the unused duration along with analysis of parking spot context and characteristics for one or more incoming secondary entities, determining one or more factors influencing the decisions as to whom to transfer the unused duration (e.g., the degree of "importance" for the secondary entity in parking within a given or selected time window) by exploiting temporal context and cognitive state, geo-spatial context, and/or other context. Some embodiments may utilize the factors that influenced the transfer to dynamically adjust or structure an incentive for the primary entity or parking authorities that control multiple parking spots.

In another aspect, the determined or predicted unused duration amount associated with a first entity (e.g., SDV) at a parking spot may be adjusted based on feedback data, for example, user feedback data. In a further aspect, predicting the duration of stay at the specified location in context may involve correlating the identified location with historical data, the contextual situation, a schedule of events at facilities in a region or area of the parking spot, and calendar entries associated with the event/location data. Still in another aspect, a method may be provided which enables dynamically changing or converting lanes on a street to parking spaces based on a current or a predicted congestion level. For instance, based on detecting or predicting congestion levels or traffic levels, an appropriate authority may be notified, which can close parts of a road or lane to be used as parking spots, for example, dynamically on an as-needed basis. Yet in another aspect, a smart parking method for autonomous vehicle may be provided in which the autonomous vehicle can detect a temporary occupier such as a street sweeper in the vicinity of a parking spot, and automatically determine that the parking spot is only temporarily or intermittently unavailable for parking. In this case the autonomous vehicle automatically drives around the area (e.g., around the block) and returns to the parking spot (for example, giving enough time for the sweeper to clean the parking spot and move on). Heretofore the streets would be closed for fixed periods of time to allow for the street sweeper to clean the streets. In the event that the street sweeper finished before the end of the fixed period of time, the parking spots on the street would not be available for parking.

In yet another aspect, a method may learn that a secondary entity (e.g., SDV, non-SDV), also referred to as second entity, is heading to or moving in a direction of the parking lot where the primary entity (also referred to as first entity) has parked, based on the secondary entity data which may be discovered by searching electronic calendar events, discovered by a geo-fencing zone passing, social media interactions, and/or other information, and trigger a determination, estimation or prediction of a primary entity's unused duration, and for example, initiate a transfer process. Based on learning or predicting that a second entity is entering or heading toward a parking lot, a query or prediction may be triggered to determine unused durations associated with one or more first entities, for instance, predicted or determined to leave the parking lot.

Yet in another aspect, a plan may be dynamically generated using smart contracts and blockchain, a list of encrypted records or block and related technology for recording and accessing data. For example, incentives may be provisioned via blockchain to the secondary entities based on user profiles and contextual situations of the secondary entities and their desire to park at a parking spot. The desirability of parking at a particular parking space may take into consideration the proximal distance of the user's predicted destination from the respective parking spots available and the parking time associated with the space which may be favorable based on an estimated duration of stay of the respective users at a particular destination.

In a further aspect, the first entity (a user or SDV) may be interested not only in exchanging unused parking duration but also additional data about the parking spot that may be useful for the secondary entity (a driver, an SDV or an occupant of SDV) to make a real-time decision (e.g., accept a generated incentive, or offer an alternative one, or pick a parking spot that is suitable for the current context or condition, for instance, to select a parking spot near a train station entrance to facilitate entry of a passenger). Additional data, which may be exchanged, may include a photo of the parking spot, short video stream, inferred characteristic of the parking spot (e.g., puddles next to the driver's side), computed proximity to building or structure entrances, location context, further time sensitiveness information, estimated risk or convenience, and/or others.

In yet another aspect, compensation or payment information in conjunction with the transfer charge and computation may be stored in discrete blocks or nodes in the blockchain for all the respective users who are/can be involved in transferring the unused time left at the respective parking spot in order for the user to later traverse through the set of transactions and cross-validate the payments executed by the secondary entities while transferring the payment via the digital currency.

FIG. 1 shows a computing system facilitating parking continuity according to an embodiment. One or more computer devices 108 may include various functions or components, which implement a methodology of the present disclosure according to embodiments. Components of a system 110 may include computer-implemented components or functionality, for instance, implemented and/or run on one or more hardware processors, or coupled with one or more hardware processors. One or more hardware processors 144, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

Components of a system 110 may be configured with one or more computing devices 108 or communication devices 102. In some embodiments, an app (such as a smartphone app or application) may be implemented, which for example, may execute on a communication device 108 and communicate with one or more components of the system 110, for example, executing on a device 108 such as a server device, a virtual machine on a cloud computing system, and/or others. A computer process implementing a method of parking continuity may be automatically triggered and run in the background as a background computer process (e.g., an operating system's daemon process), for example, on a user's device 102 and/or a device 108, responsive to receiving an acknowledgment of a first entity's payment for parking (e.g., at a parking lot, a municipal meter, or at another parking location), triggered based on user-specified rules, and/or triggered by scanning a parking ticket, for example, using an app (e.g., the app associated with the system or another app that communicates with the system) that runs an image recognition algorithm, or by scanning a Quick Response Code (QR code) of the parking ticket (e.g., if enabled), but not limited to such. Other triggering mechanism may be implemented.

In one embodiment, the system 110 may receive and analyze miscellaneous data sources 114 (e.g., "parking continuity data") of a first entity 104 or an occupant of the first entity's vehicle, a second entity 106 or occupants of the second entity's vehicle, historical data 116 such as historical data of unused duration amounts for a similar location or parking lot, historical calendar data, historical behavioral data, profile of each entity, user or occupant, data from real-time monitoring of the user mobility devices (accelerometer, GPS, gyroscope, etc), historical communication means, geo-location, and/or others. Additional data received and considered may include weather and location context data 118 and interaction and call data 120. All or some of such information may be provided or received from the first and second entities (e.g., from devices associated with the first and second entities) in an opt-in/opt-out basis.

In a similar opt-in and opt-out manner, the system may also receive and analyze data from an entity's electronic calendar, for example, locations, durations and appointments. In another embodiment, the system considers the time for events for establishments (e.g., commercial establishments) or the like in the "vicinity" of the parking lots. For instance, event monitor functionality 122 may monitor events. To determine whether an event is occurring in the vicinity of a given parking lot, a threshold distance factor may be preconfigured, and a distance (e.g., geographical distance) between the location of the event and the parking lot and the threshold distance factor may be compared. If the distance between the location of the event and the parking lot is less than the threshold distance, it may be determined that the event is occurring in the vicinity of the parking lot. Entities may typically arrive at a train station parking lot within 15 minutes before the departure of a train (an example of an event), and entities may exit the parking lot within 5 minutes after the arrival of a train (another example of an event). Thus, the departure and arrival times of entities at a parking lot near a train station may tend to be discrete time intervals. As another example, similar considerations can be implemented for arrival and departure times in parking lots near concerts or other venues depending on the start and end time of the concerts or other venues.

A system in some embodiments may also provide a method for second entities (e.g., vehicles) 106 to bid for spots from the first vehicle 104. For instance, payment gateway functionality 124 may allow users to bid for spots and accept bids. A starting bid rate may be determined based on the remaining time and cost for that time, but may be modifiable considering local traffic demand for spots and predicted availability of the other spots from other primary vehicle owners.

Unused duration estimator functionality 112 may calculate, determine and/or predict unused duration. The unused duration may be monitored and calculated by analyzing a first entity's location data such as a global positioning system (GPS) data and clock or current time. For instance, a first entity's parked location and the time or arrival at the location may set the start of the parking duration. Analyzing a transaction (e.g., charge or recharge) may determine the amount of time that was paid for, as there may be discrete charges for given amounts of time (e.g., 1 monetary unit for 1 hr, 2 monetary unit for 2 hrs).

In some embodiments, the parking continuity data is synthesized and analyzed using one or more machine learning algorithms and building one or more predictive models that can be used for detecting or predicting an unused duration amount of the parking ticket. The system may send the determined or predicted unused duration amount to the user or occupant of the first entity device (e.g., mobile phone or another device of the first entity) 102, for example, for further receiving feedback, getting approval, and/or otherwise communicating with the first entity 104 regarding the determined or predicted unused duration amount. In some embodiments, based on the received feedback, the method of determining or predicting unused duration amount is automatically adjusted.

The system may learn that a second entity 106 is heading to the parking lot where the first entity 104 has parked based on the second entity data (e.g., GPS data, calendar events, learned from conversation, discovered by a geo-fencing zone passing, social media interactions, and/or other data) and determine whether a first entity unused duration is available, e.g., at that parking lot or within a threshold distance of where the second entity 106 is heading.

Usage of GPS data also enables marking of the parking spots utilized by the first entity. In an opt-in/opt-out manner (for example, such that any data pertaining to a user is determined or used based a user's permission), a user's movement such as a user returning to the location where the user's vehicle is parked can aid in predicting that the user's vehicle is ready to leave the parking spot. For example, such data can trigger early notification of when users might be returning to a vehicle to increase the scheduling window of the parking space.

In a further instance, where a first entity 104 (a user or a self-driven vehicle, SDV) may be interested not only to exchange unused parking duration but also additional data about the parking spot that may be useful for the second entity 106 (a driver, an SDV or an occupant of SDV) to make a real-time decision (e.g., accept a generated incentive, or offer an alternative one, or picking a parking spot that is suitable for their context or condition, for instance a spot near the train station entrance to facilitate the entry for a passenger).

For example, the data may include photos of the parking spot, a video stream, inferred characteristics of the parking spot (e.g., puddles next to the driver's side), computed proximity to nearby entrances, location context, further time sensitiveness information, estimated risk or convenience, and/or others. For example, in one example scenario, the system may automatically detect and characterize the parking spot with respect to road-surface risk (e.g., possible puddle, snow) or convenience for an occupant of the incoming entity who may open the door of the vehicle (e.g., a passenger of a SDV) and step out, for example, considering and quantifying at least one state variable relating to an occupant (e.g., health state, high heels, and/or others). Such consideration may help, for example, in scenarios in which items such as a stroller or wheelchair or another item may need to be opened or handled next to a parked vehicle.

Context dependent data such as location, proximity to main entrance, access to facilities, and/or others, may be considered, for instance, which data may affect a second entity's decision as to where to park the vehicle. For instance, an occupant of the second entity may need to be at a place (e.g., for a meeting or an appointment) within a limited time, and the distance between an available parking spot and an entrance to the place may influence the second entity's decision as to which parking spot to use.

The system may analyze and determine context of the first entity, the first entity user or occupants, second entity, second entity user or occupants using the context analyzer module. This module may comprise current location analysis and approximate duration of stay at the said location or parking spot based on at least second entity's calendar information, geo-spatial and temporal metrics, previous pattern history, etc. The results of the context analyzer may be consumed by the unused duration estimator in order to compute the time of broadcast and further estimate the charge to be requested from the primary entity. In some embodiments, components or functionalities such user context analyzer 126, as geo-spatial context analyzer 128, parking spot analyzer 130 and mobility/event analyzer 132 may function to provide data used in determining unused duration of a suitable parking spot by an unused duration estimator 112 for a second entity 106.

Transfer score estimator component or functionality 134 may compute a transfer score associated with a second entity 106. In some embodiments, transfer score estimator 134 may include a rectified linear unit (ReLU), sigmoid function or another function of user configurable parameters, which may include vectored inputs obtained from geo-spatial context analyzer 128, parking spot analyzer 130, mobility/event analytics 132 and/or user context analysis engine 126. In some embodiments, a transfer score may be generated for each received requests of the determined unused duration of a parking spot. In some embodiments, the transfer score may be generated based on the second entity 106, one or more occupants of the second entity 106 and/or other factors. For instance, based on the transfer score, a transfer modulation module or functionality 136 may dynamically select a second entity to transfer the unused duration. In some embodiments, the transfer modulation module or functionality 136 may, for example, via incentive generator functionality 138 (also referred to as incentive generator) and payment gateway functionality 124 (also referred to as payment gateway), structure a financial incentive, for example, based on the detected parking spot characteristics and computed transfer score.

Incentive generator 138 may provision an incentive to a second entity based on entity profile 140 (which may include user profile, e.g., occupant of a vehicle) and contextual situation of the second entity and the second entity's desire to park at a parking spot. The incentive generator 138 may perform its function for a plurality of second entities. The desirability of parking at a particular parking space may be determined based on the proximal distance of a user's (e.g., vehicle occupant's) predicted destination from the parking spot available and the parking time associated with the space, which may be considered favorable based on the estimated duration of stay of the respective user's at a particular destination.

Data used as input to compute a user-parking spot affinity (e.g., in terms of the temporal degree of desirability for a user or cohort) may be obtained from geo-spatial temporal metrics store (e.g., which may store data such as location profile such as information about a location, weather data, temperature, context profile, sensed data via cameras, visual sensors, auditory or health sensors), spacing with respect to other vehicles (some users may prefer to keep proper distance from other parked vehicles), other nearby computing or communication devices, and other data sources such as social media data (e.g., social network application data), and users' profiles. User profiles can include data such as use preferences, for example, parking close to a train station, parking spots with abundant amount of light, and/or others. In another aspect, user preferences can be dynamically learned based on pattern history and establishment of confidence level (rigidity factor) over time as a factor for taking subsequent actions without human intervention.

Blockchain logger functionality 150 (also referred to as blockchain logger) may store payment information, e.g., with a transfer charge, and associated computation in discrete blocks or nodes in the blockchain for all the respective users who are or can be involved in transferring the unused time left at the respective parking spot. The blocks or nodes can be traversed to examine the set of transactions and cross-validate the payments executed by secondary entities while transferring the payment via the digital currency. For instance, a first entity with unused duration for a parking spot which is being transferred can be rewarded via digital currency, for instance, on a social media portal, for the time or duration the new user (second entity) will utilize the parking space, e.g., the amount of time that was left for the space and the time the new user used the available space.

In addition, simultaneously for example, a rating of a parking space, e.g., provided by the respective entities associated with the nodes and digital identifiers, can be stored with the payment processing method (e.g., credit card, or cryptocurrency such as bitcoin or another for transferring payment). The rating at a particular spot can be viewed by other users, which rating can provide the other users an incentive to park at a particular spot.

In some embodiments, an autonomous vehicle (AV, or also referred to as SDV), in functioning as a second entity, may have a digital identifier location pertaining to a user associated with the AV and a transaction can be conducted by the AV without the involvement of the user, for example, by accessing a digital wallet of the user, and transacting with a first entity based on inspecting the unused time left at the specific parking location.

Another example usage scenario is described as follows with reference to an example commuter application. To reduce the need for parking in a city center, and to service car commuters who may not want to take their vehicle into the city center, a park and ride lot external to the city center may provide parking spaces. Utilizing a methodology described above, unused durations may be transferred between a commuter's vehicle and a service vehicle such as a taxi, for instance, which may include AVs. A taxi AV may occupy a space during evening hours or off hours. As a commuter vehicle arrives at the park and ride lot in the morning, a methodology described above may negotiate the exchange of parking rates and time from the taxi AV to the commuter vehicle. The taxi AV may surrender the spot to the commuter user's vehicle, and the user may engage and take the taxi AV in a single transaction. The taxi AV may service riders in the city center until called to return in the evening to the park and ride lot where the exchange is made again, and the taxi AV parked for the evening. Such methodology may occur for multiple tax AVs occupying multiple parking spaces in a parking lot.

Yet as another example, a methodology described herein may be involved in dynamic zoning of parking. For instance, utilizing local parking zoning laws, a methodology may be able to provide contextual modification of regulation to increase or decrease the number of parking spots along traffic areas. For example, cities that have static parking start and end times in traffic areas can employ a methodology of the present disclosure, to increase the availability of parking spots and to collect an optimized reward for a parking spot that was ineligible under static zoning regulation. In this embodiment, the parking authority controls parking spots that can be released for parking even before the official start time for parking is reached. This process is controlled via a contextualized demand and supply that considers a need for parking and a need to reduce traffic in congested areas. For instance, a transfer score value may be evaluated which combines inputs triggered from a combination of geo-spatial and temporal metrics, one or more rules or regulations pertaining to a confined region, number of open and occupied parking spots, and future desirable spots based on pricing. A computer executable component of functionality such as a zoning manager 148 may implement managing of dynamic zoning of parking by taking the contextualized demand and supply data from various processing modules and data points (e.g., parking regulation data, real-time congestion data from remote sensing data, IoT data, and/or others).

Still as another example, a methodology described herein may be involved in ad hoc parking application. For instance, as SDVs and AVs are adopted widely, situations may occur in which these vehicles may be circling the streets, even without occupants, in fully autonomous mode if a parking space cannot be found. Such situations may create a congestion and even unsafe conditions. With a methodology of the present disclosure in one embodiment, such vehicles that are seeking parking on their own may be allocated ad hoc parking locations by a municipality comprising surrounding normal usage of lanes in a road based on negotiation with the SDVs using functions similar to negotiating for a parking space with unused duration. In this case, the municipality is negotiating a right of way for temporary usage as parking. With respect to parking spaces created by temporarily closing roads, different vehicles may communicate with each other based on intended duration of stay at a particular parking spot, pricing, user context which, for example, may trigger a Message Queuing Telemetry Transport (MQTT) enabled communication protocol (or another communication protocol) to initiate a negotiation to utilize a parking spot. Such communication may be performed based on user configurable thresholds which may vary from one user to another. In some embodiments, a zoning manager component or functionality 148 may implement this function. Examples of vehicles participating in this example scenario can be one or more of automated, self driven vehicles and/or manually driven vehicles.

Broadcaster and receiver component or functionality 142 may broadcast or transmit information to one or more second entities 106 in need of a parking space based on determination of profiles and contextual characteristics of one or more second entities. Receiver portion of the functionality may include receiving information related to unused parking time left at specific locations based on proximity and cognitive state of the second entities (e.g., SDVs or manual vehicles) in order to transmit the information to selected set of second entities over communication network and/or devices such as secure wireless network. Broadcaster portion of the functionality may transmit the information. In some aspects, other devices in proximal distance and having similar geo-spatial metrics (e.g., fetched from wearable devices, calendar data and historical pattern analysis) may be notified of the available parking space with the time left to be utilized to park. End-user and telecommunication device manager component or functionality 146 may manage data associated with different entities and communication channels Considering the case of autonomous vehicles (AVs), in one embodiment, AVs can communicate with each other via a wireless interface module connected to a centralized vehicle station and may be capable of monitoring each other's geo-spatial metrics and user's profile information related to the duration of stay and departure. Multiple AVs can coordinate with each other in order to readjust their positions based on time left at the meter and move onto other areas. AVs can communicate with parking meters in order to pay via associated users' digital currency and while departing from one spot, can indicate to another AV in the vicinity which may be searching for a parking space or may be arriving at the destination to take the parking space so that unused time can be used in an efficient manner.

In one aspect, data, which is communicated between the components shown in FIG. 1, can be formatted into data packets, for example, having structures such as header information, payload, error detecting code such as a cyclic redundancy check (CRC) code, and/or others. In another aspect, the data may be encrypted and formatted into data packet frames.

Figure 2:
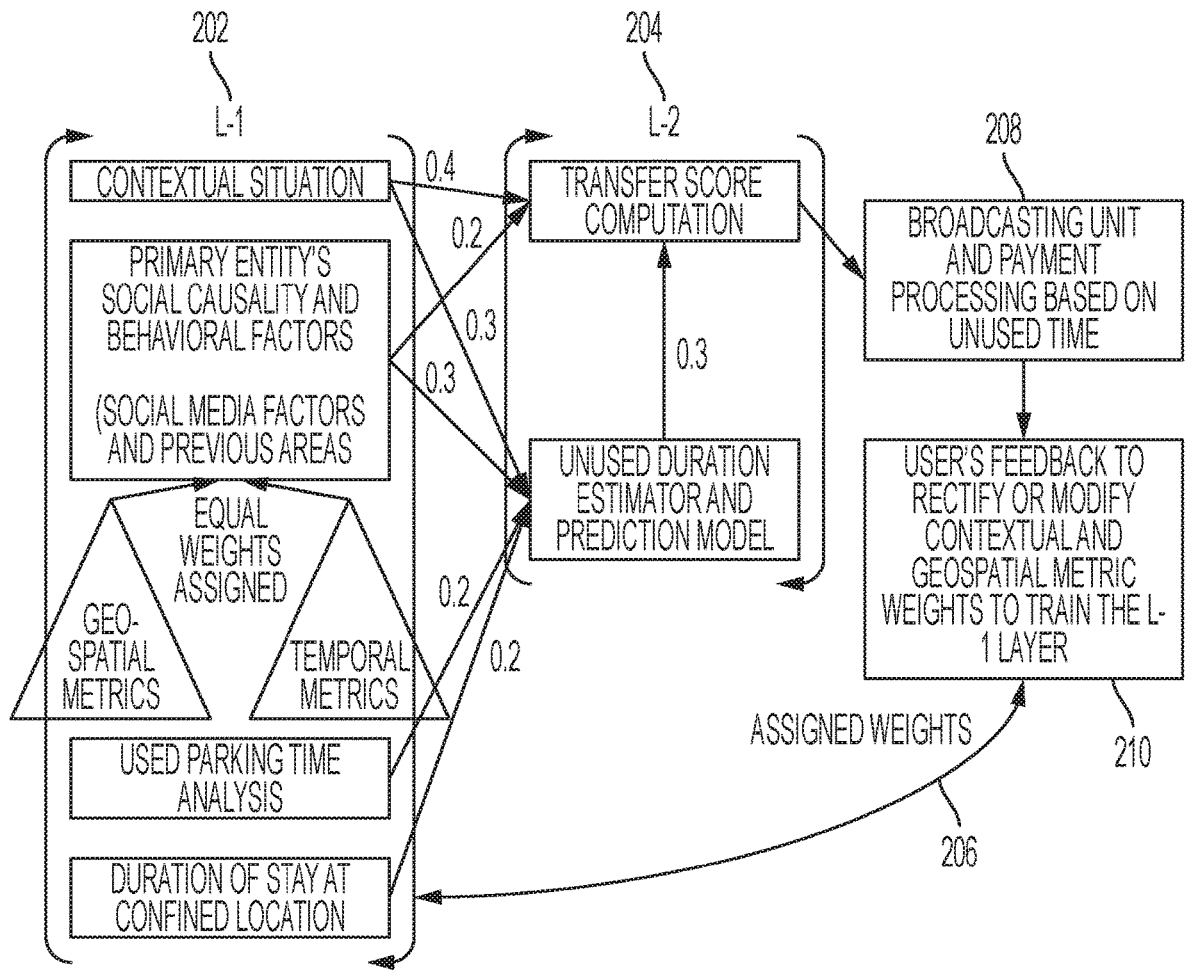
FIG. 2 illustrates an example implementation of determining unused duration in one embodiment.

FIG. 2 illustrates an example implementation of determining unused duration in one embodiment. For instance, unused duration estimator 112 shown in FIG. 1 may include an artificial neural network, which may be trained to predict an unused duration and, for example, also compute a transfer score associated with a second entity. An artificial neural network can include multiple layers and a layer can include multiple nodes (also referred to as neurons). Nodes of layers can be interconnected in succession, e.g., nodes of a layer interconnected to nodes of a next layer in the network. Output values or signals from the nodes in one layer can be weighted and transmitted to nodes in the next layer. A neural network may be multi-level, and may include an input layer 202, one or more intermediate layers (also referred to as hidden layers) 204 and an output layer (shown as part of 204). Weights can be assigned to a node-node connection, for instance, such that a signal transmitted from a source node to a target node is weighted by the assigned weight between the two nodes. Input layer 202 may include a number of nodes representing input features, which are input to predict unused duration. A weight may be assigned to each input feature and can be reconfigured based on importance given to each input feature data set. Nodes in the intermediate layers may receive weighted signals from the interconnected previous layer, and generate an output signal based on executing an activation function using the received weighted signals. The generated output signal then may be transmitted to a node of a next layer. An example training may include using a backpropagation technique and training the neural network can adjust the weights. In some embodiments, reinforcement learning feedback is used to fortify or configure the weights assigned to the initial input features as shown at 206. In some embodiments, a neural network can be implemented on special hardware such as a field programmable gate array (FPGA) or another processor implemented for neural network configuration. For instance, a special hardware may include memory cells or blocks that store the weights and a logic block or circuitry implementing the artificial neural network computations. In one aspect, the neural network may train a classifier. For instance, the trained neural network model may output a classification. The computed or predicted unused duration can be broadcasted to a second entity, or to a selected second entity which may be selected based on the computed transfer score.

Input features in the input layer 202 may include, but are not limited to, contextual situation, first entity's social causality and behavioral factors (which may include geo-spatial metrics and temporal metrics), used parking time analysis, and duration of stay at a location. Contextual situation may include current engagement or meeting such as real-time information obtained from Internet Protocol (IP) cameras and mobile devices, which may also include information associated with events occurring within a threshold distance of the parking space. Social causality may include information obtained based on pattern history of users such as social media information. Such user information may be obtained based on user opting-in to allow access to such information. For instance, natural language processing and classification techniques may be implemented to perform keyword extraction for estimating data such as the length of a meeting and adjusting weights to different data inputs. Used parking time analysis may include monitoring and/or determining the length of time paid for and left at the current location, for example, 30 minutes time is over out of 1 full paid hour. Duration of stay at a confined location may specify the total time (e.g., estimated or predicted) at the location a vehicle may stay in terms of time such as hours or minutes, based on one or more events such as contextual situation. One or more layers at 204 may include nodes, each of which may compute an activation function based on the input. Weights of the nodes may be adjusted via a back propagation technique, in training a neural network model for predicting unused duration. The neural network may be also trained to compute or predict a transfer score, for example, based on the predicted unused duration, contextual situation (e.g., input feature) and the first entity's social causality and behavioral factors (e.g., input feature). In some embodiments, based on the transfer score computation, the unused time may be transmitted and payment can be processed at 208. User feedback may be received at 210, based on which weights of the input features can be adjusted. The adjusted weights can be fed into the input layer 202.

Figure 3:
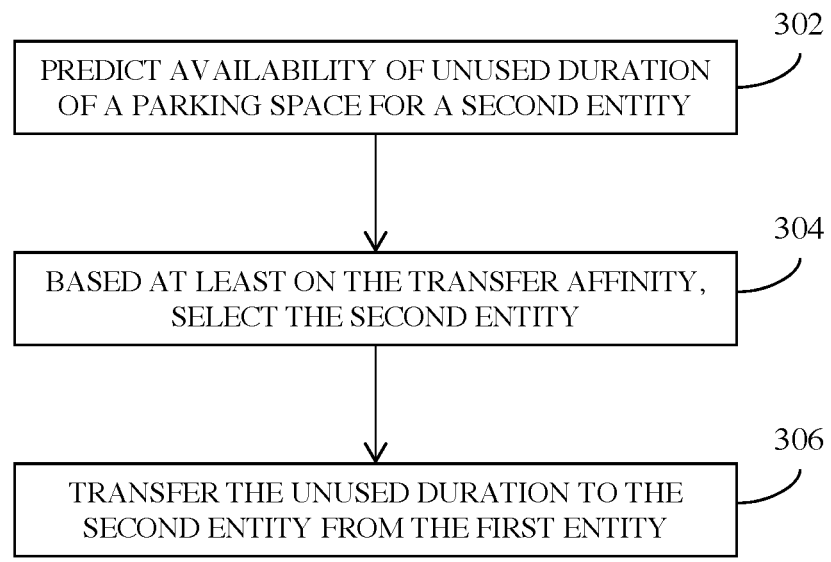
FIG. 3 is a flow diagram illustrating a method in one embodiment.

FIG. 3 is a flow diagram illustrating a method in one embodiment. The method, for instance, transfers predicted unused duration associated with a parking space, for instance, predicted using a trained machine learning model, for example, an artificial neural network model. At 302, availability of unused duration of a parking space is predicted for a second entity. Predicting may include executing a computer-implemented, artificial neural network trained to predict the availability of unused duration of a parking space. Such artificial neural network, for instance, may have been trained based on input features, which may include but are not limited to a contextual situation associated with the second entity, a behavior factor associated with a first entity that has been using the parking space, geographical location and time, events occurring within a threshold distance from the parking space. The trained artificial neural network may also output a transfer affinity or transfer score based on the predicted availability of the unused duration, the contextual situation associated with the second entity and the behavior factor associated with the first entity. For instance, the artificial neural network may have been further trained to predict a transfer affinity based on historical data which may include availability of the unused duration, contextual situation associated with the second entity and behavior factor associated with the first entity.

At 304, based at least on the transfer affinity, the second entity may be selected. At 306, the unused duration can be transferred to the second entity from the first entity. For instance, a data packet may be transmitted to the second entity, which data packet may include communication header information and payload information indicating the availability of the unused duration. Such data packet may be transmitted over a communication network. The payload information may include a notification and/or the amount of the unused duration. The payload information of the data packet may also include other data associated with the parking space, for example, an image of the parking space, inferred characteristic associated with the parking space and/or other data. Transferring may also include storing a payment and associated computation as a blockchain node in a blockchain. In some embodiments, the first entity and the second entity comprise automated self-driving vehicles. In some embodiments, the first entity and the second entity, which are automated self-driving vehicles, can automatically exchange the unused duration and the payment without human input. In some embodiments, the method may also include communication traffic congestion data associated with an area, detected by at least one of the first entity and the second entity, to a traffic authority, for example, to allow the traffic authority to initiate creating dynamically of temporary parking spaces based on the congestion data. In some embodiment, another artificial intelligence model may be trained, which can predict whether the second entity is heading to the parking space. The artificial intelligence model may be trained based on historic data associated with travel patterns of the second entity. Based on a prediction that the second entity is heading to the parking space, predicting of the availability of unused duration of a parking space can be triggered.

Figure 4:
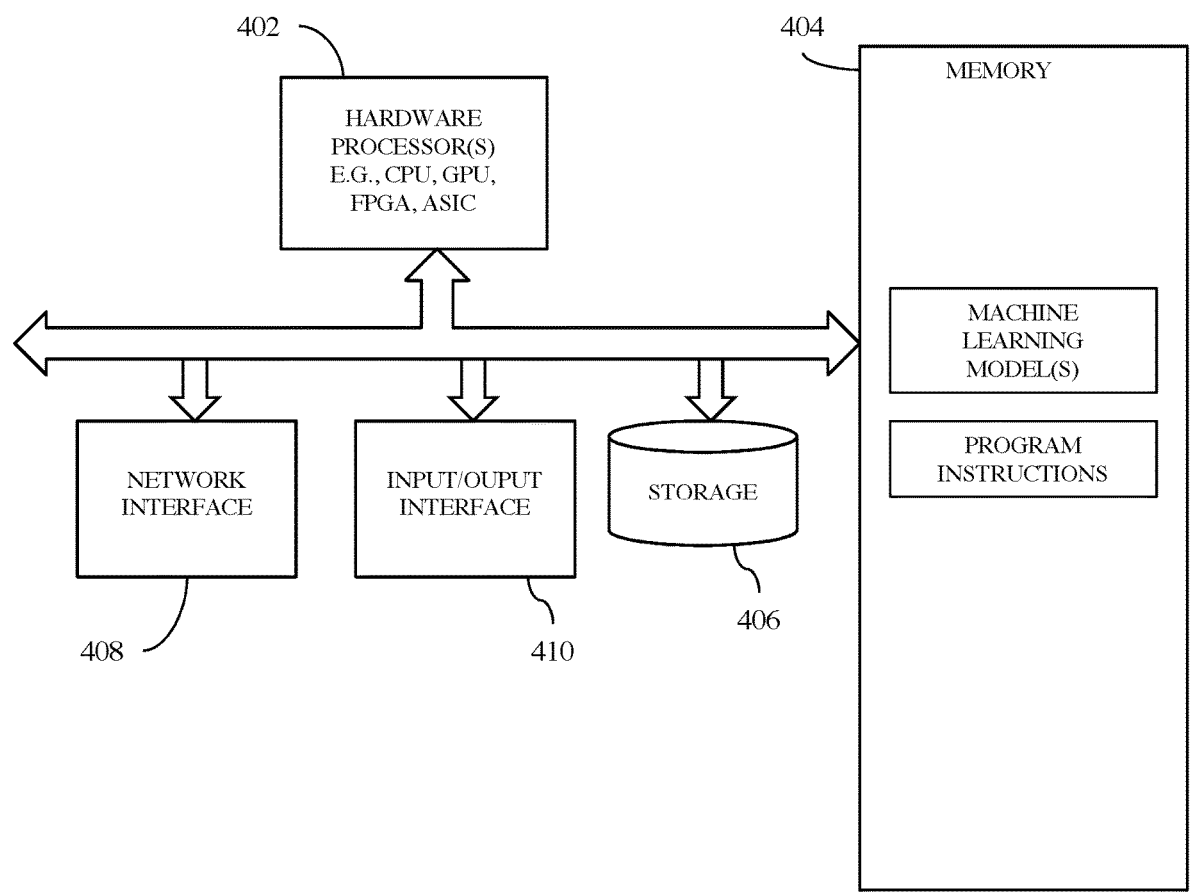
FIG. 4 is a diagram showing components of a system in one embodiment, which may implement parking continuity apparatus and/or method.

FIG. 4 is a diagram showing components of a system in one embodiment, which may implement parking continuity apparatus and/or method. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and predict unused parking duration availability. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 404 may, for example, store instructions and/or data for functioning of one or more hardware processors 402, and may include an operating system and other program of instructions and/or data. One or more hardware processors 402 or different one or more hardware processor may perform training of a neural network model, which can predict unused duration associated with a parking space. Such a model may be stored in the memory device 404, and/or a storage device 406, and/or may be received via a network interface 408 from another processor or computer system, for example, for execution by one or more hardware processors 402. Other configurations for storing the model are possible. One or more hardware processors 402 may also initiate communications between an automated vehicle searching for a parking space and another automated vehicle giving up a parking space. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
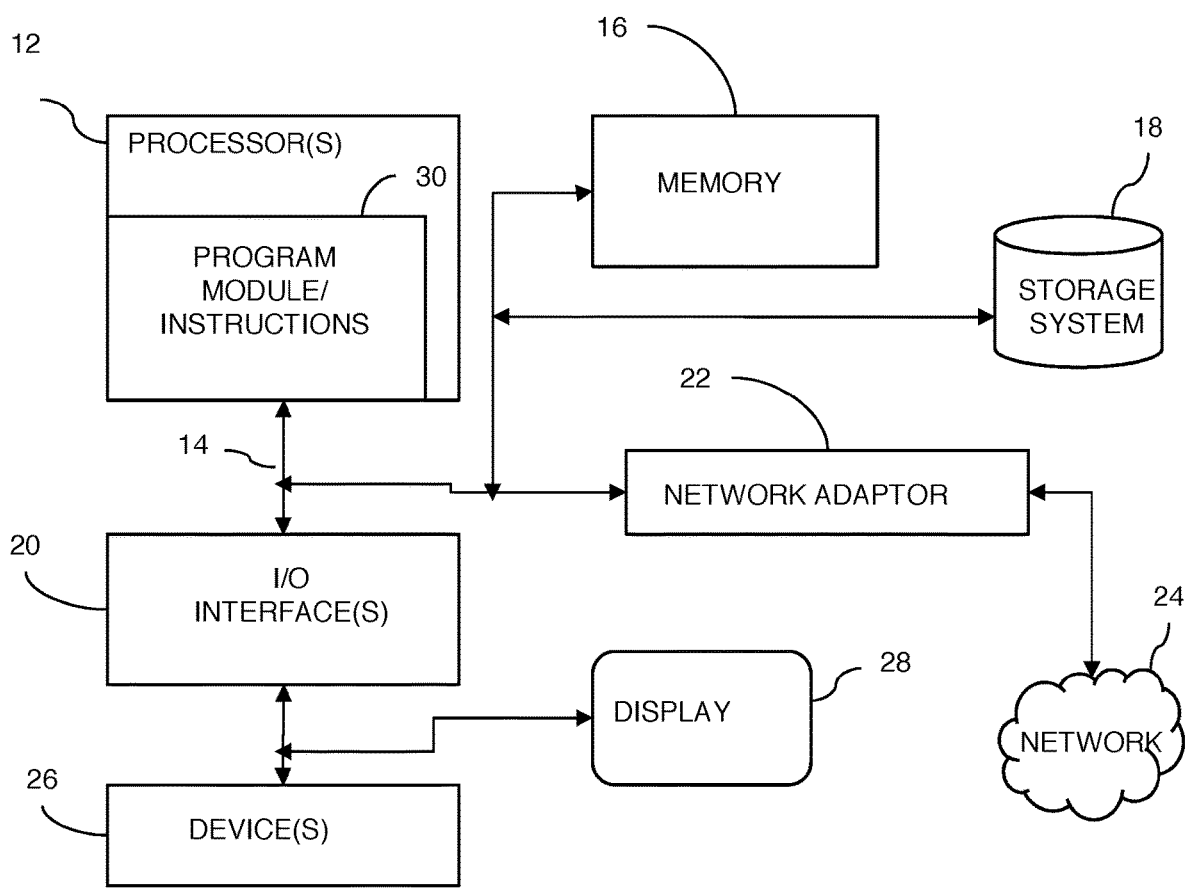
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method, comprising:
predicting availability of an unused duration of a parking space for a second entity, the predicting comprising executing a computer-implemented, artificial neural network trained to predict the availability of an unused duration of a parking space based on input features comprising at least a contextual situation associated with the second entity, a behavior factor associated with a first entity that has been using the parking space, geographical location and time, events occurring within a threshold distance from the parking space, the artificial neural network further trained to output a transfer affinity based on the predicted availability of an unused duration, the contextual situation associated with the second entity and the behavior factor associated with the first entity, the artificial neural network trained to predict the availability of the unused duration of the parking space predicting that the first entity is leaving the parking space so as to result in the unused duration;
based at least on the transfer affinity, selecting the second entity; and
transferring the unused duration to the second entity from the first entity, the transferring further comprising storing a payment and associated computation as a blockchain node in a blockchain,
wherein the first entity and the second entity comprise automated self-driving vehicles and the first entity is allowed to exchange data for allowing the second entity in making a real-time decision, the data including at least a video stream, characteristic of the parking space including existence of puddles on the driver's side, and time sensitive information associated with the parking space,
wherein the second entity is further operable to automatically detect that the parking space is temporarily unavailable for parking and in response autonomously drive around area of the parking space and return after an amount of time.

2. The computer-implemented method of claim 1, wherein the transferring comprises transmitting a data packet to the second entity over a communication network, the data packet comprising header information and payload information indicating the unused duration.

3. The computer-implemented method of claim 2, wherein the payload information in the data packet further comprises data associated with the parking space comprising at least an image of the parking space.

4. The computer-implemented method of claim 2, wherein the payload information in the data packet further comprises data associated with the parking space comprising at least an inferred characteristic associated with the parking space.

5. The computer-implemented method of claim 1, further comprising communicating traffic congestion data associated with an area, detected by at least one of the first entity and the second entity to a traffic authority, to allow the traffic authority to initiate creating dynamically of temporary parking spaces based on the congestion data.

6. The computer-implemented method of claim 1, wherein the first entity and the second entity automatically exchange the unused duration and the payment.

7. The computer-implemented method of claim 1, further comprising training an artificial intelligence model that predicts whether the second entity is heading to the parking space, the artificial intelligence model trained based on historic data associated with travel patterns of the second entity, and based on a prediction that the second entity is heading to the parking space, triggering the predicting of the availability of unused duration of a parking space.

8. A system, comprising:
at least one hardware processor;
a memory device coupled with the at least one hardware processor; and
a communication interface coupled to the at least one hardware processor;
the at least one hardware processor operable to at least perform:
predicting availability of an unused duration of a parking space for a second entity, the predicting comprising executing a computer-implemented, artificial neural network trained to predict the availability of an unused duration of a parking space based on input features comprising at least a contextual situation associated with the second entity, a behavior factor associated with a first entity that has been using the parking space, geographical location and time, events occurring within a threshold distance from the parking space, the artificial neural network further trained to output a transfer affinity based on the predicted availability of an unused duration, the contextual situation associated with the second entity and the behavior factor associated with the first entity, predicting the availability of the unused duration of the parking space including predicting that the first entity is leaving the parking space so as to result in the unused duration;
based at least on the transfer affinity, selecting the second entity; and
transferring the unused duration to the second entity from the first entity, the transferring further comprising storing a payment and associated computation as a blockchain node in a blockchain,
wherein the first entity and the second entity comprise automated self-driving vehicles and the first entity is allowed to exchange data for allowing the second entity in making a real-time decision, the data including at least a video stream, characteristic of the parking space including existence of puddles on the driver's side, and time sensitive information associated with the parking space,
wherein the second entity is further operable to automatically detect that the parking space is temporarily unavailable for parking and in response autonomously drive around area of the parking space and return after an amount of time.

9. The system of claim 8, wherein the at least one hardware processor transferring the unused duration comprises transmitting a data packet to the second entity over a communication network, the data packet comprising header information and payload information indicating the unused duration.

10. The system of claim 9, wherein the payload information in the data packet further comprises data associated with the parking space comprising at least an image of the parking space.

11. The system of claim 9, wherein the payload information in the data packet further comprises data associated with the parking space comprising at least an inferred characteristic associated with the parking space.

12. The system of claim 8, further comprising communicating traffic congestion data associated with an area, detected by at least one of the first entity and the second entity to a traffic authority, to allow the traffic authority to initiate creating dynamically of temporary parking spaces based on the congestion data.

13. The system of claim 8, wherein the first entity and the second entity automatically exchange the unused duration and the payment.

14. The system of claim 8, further comprising training an artificial intelligence model that predicts whether the second entity is heading to the parking space, the artificial intelligence model trained based on historic data associated with travel patterns of the second entity, and based on a prediction that the second entity is heading to the parking space, triggering the predicting of the availability of unused duration of a parking space.

15. A computer readable storage medium storing a program of instructions executable by a machine to perform a method, comprising:
predicting availability of an unused duration of a parking space for a second entity, the predicting comprising executing a computer-implemented, artificial neural network trained to predict the availability of an unused duration of a parking space based on input features comprising at least a contextual situation associated with the second entity, a behavior factor associated with a first entity that has been using the parking space, geographical location and time, events occurring within a threshold distance from the parking space, the artificial neural network further trained to output a transfer affinity based on the predicted availability of an unused duration, the contextual situation associated with the second entity and the behavior factor associated with the first entity, the artificial neural network trained to predict the availability of the unused duration of the parking space predicting that the first entity is leaving the parking space so as to result in the unused duration;
based at least on the transfer affinity, selecting the second entity; and
transferring the unused duration to the second entity from the first entity, the transferring further comprising storing a payment and associated computation as a blockchain node in a blockchain, wherein the first entity and the second entity comprise automated self-driving vehicles and the first entity is allowed to exchange data for allowing the second entity in making a real-time decision, the data including at least a video stream, characteristic of the parking space including existence of puddles on the driver's side, and time sensitive information associated with the parking space, wherein the second entity is further operable to automatically detect that the parking space is temporarily unavailable for parking and in response autonomously drive around area of the parking space and return after an amount of time.

16. The computer readable storage medium of claim 15, wherein the transferring comprises transmitting a data packet to the second entity over a communication network, the data packet comprising header information and payload information indicating the unused duration.

17. The computer readable storage medium of claim 16, wherein the payload information in the data packet further comprises data associated with the parking space comprising at least one of an image of the parking space and inferred characteristic associated with the parking space.

* * * * *